US012632977B2

(12) United States Patent
Choi et al.

(10) Patent No.:     US 12,632,977 B2
(45) Date of Patent:          May 19, 2026

(54) MEASUREMENT METHOD USING AR, AND ELECTRONIC DEVICE

(71) Applicant: Samsung Electronics Co., Ltd., Suwon-si (KR)

(72) Inventors: Daiwoong Choi, Suwon-si (KR); Sungoh Kim, Suwon-si (KR); Sehoon Kim, Suwon-si (KR); Yanggeun Oh, Suwon-si (KR); Dasom Lee, Suwon-si (KR); Sanghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 18/352,681

(22) Filed: Jul. 14, 2023

(65) Prior Publication Data

US 2023/0360245 A1      Nov. 9, 2023

Related U.S. Application Data

(63) Continuation of application No. PCT/KR2022/003530, filed on Mar. 14, 2022.

(30) Foreign Application Priority Data

Mar. 15, 2021      (KR) ........................ 10-2021-0033617

(51) Int. Cl.
*G06T 7/60*          (2017.01)
*G06T 7/50*          (2017.01)
*G06T 11/00*         (2026.01)

(52) U.S. Cl.
CPC .................. *G06T 7/60* (2013.01); *G06T 7/50* (2017.01); *G06T 11/003* (2013.01)

(58) Field of Classification Search
CPC combination set(s) only.
See application file for complete search history.

(56) References Cited

U.S. PATENT DOCUMENTS 8,244,462 B1      8/2012 Zhu
10,275,945 B2     4/2019 Lee et al.
(Continued)

FOREIGN PATENT DOCUMENTS

CN          105180802 A      12/2015
CN          109255840 A       1/2019
(Continued)

OTHER PUBLICATIONS

JP2012151851A_machine English translation (Year: 2012).*

*Primary Examiner* — Vu Le
*Assistant Examiner* — Matthew James Bodnark
(74) *Attorney, Agent, or Firm* — Nixon & Vanderhye P.C.

(57)          ABSTRACT

Disclosed in an embodiment according to the present disclosure is an electronic device comprising: a camera, a display, a sensor configured to acquire depth information about at least one object, and at least one processor electrically connected to the camera, the display and the sensor, wherein the at least one processor is configured to display, as a preview image on the display, an image acquired by driving the camera, acquire an input for designating a start point and an end point on a subject included in the preview image, acquire depth information about the subject through the sensor, correct the start point and the end point on the basis of the acquired depth information, and measure the length of the subject on the basis of the distance between the corrected start point and the corrected end point.

18 Claims, 8 Drawing Sheets

(56) References Cited

U.S. PATENT DOCUMENTS

| | | | |
|---|---|---|---|
| 10,612,908 | B2 | 4/2020 | Dryer et al. |
| 10,721,391 | B2 | 7/2020 | Park et al. |
| 11,209,937 | B2 | 12/2021 | Yoganandan et al. |
| 11,226,675 | B2 | 1/2022 | Roh et al. |
| 11,573,627 | B2 | 2/2023 | Grzesiak |
| 2011/0249117 | A1 | 10/2011 | Yoshihama et al. |
| 2017/0302908 | A1 | 10/2017 | Richards |
| 2020/0265600 | A1 | 8/2020 | Oh et al. |
| 2021/0037225 | A1 | 2/2021 | Pepperell et al. |

FOREIGN PATENT DOCUMENTS

| | | | | | |
|---|---|---|---|---|---|
| GB | 2327024 | A | * | 1/1999 | ............. G06T 17/00 |
| JP | 2020148628 | A | * | 9/2020 | ............. G06T 7/60 |
| KR | 20160019305 | A | | 2/2016 | |
| KR | 20160146567 | A | | 12/2016 | |
| KR | 20190019605 | A | | 2/2019 | |
| KR | 20190058839 | A | | 5/2019 | |
| KR | 20200091988 | A | | 8/2020 | |
| KR | 20210006278 | A | | 1/2021 | |
| KR | 102218805 | B1 | | 2/2021 | |

* cited by examiner

100

403b

405b

500

405a

403a

MEASUREMENT METHOD USING AR, AND ELECTRONIC DEVICE

CROSS-REFERENCE TO RELATED APPLICATIONS

This application is a continuation of International Application No. PCT/KR2022/003530 designating the United States, filed on Mar. 14, 2022, in the Korean Intellectual Property Receiving Office and claiming priority to Korean Patent Application No. 10-2021-0033617, filed on Mar. 15, 2021, in the Korean Intellectual Property Office, the disclosures of each of which are incorporated by reference herein in their entireties.

BACKGROUND

Field

The disclosure relates to a technique for measuring the length of a subject in a preview image, based on augmented reality (AR).

Description of Related Art

Augmented reality (AR) is a technology for synthesizing virtual objects or information in an existing environment to make them look like objects existing in the original environment. An electronic device for providing augmented reality can acquire a preview image of a real object through a camera, and recognize (or identify) the real object. Meanwhile, the electronic device can measure the length of a subject included in the preview image, based on augmented reality.

When the length of a subject is measured based on augmented reality, it is difficult to accurately measure the length of the subject because positions of a start point and an end point specified by a user to measure the length are not accurate.

The technical problem to be addressed in the present disclosure is not limited to the technical problem mentioned above, and other technical problems not mentioned can be clearly understood by a person having ordinary skill in the art to which the present disclosure pertains from the description below.

SUMMARY

An electronic device according to an example embodiment may include: a camera, a display, a sensor configured to acquire depth information about at least one object, and at least one processor electrically connected to the camera, the display and the sensor. The at least one processor may be configured to control the display to display an image acquired by driving the camera as a preview image on the display, acquire an input specifying a start point and an end point on a subject included in the preview image, acquire depth information about the subject through the sensor, correct the start point and the end point based on the acquired depth information, and measure a length of the subject based on a distance between the corrected start point and the corrected end point.

A method of operating an electronic device according to an example embodiment may include: displaying an image acquired by driving a camera as a preview image on a display, acquiring an input specifying a start point and an end point on a subject included in the preview image, acquiring depth information about the subject through a sensor, correcting the start point and the end point based on the acquired depth information, and measuring a length of the subject based on a distance between the start point and the end point.

An electronic device according to an example embodiment may include: a camera, a display, a sensor configured to acquire depth information about at least one object, and at least one processor electrically connected to the camera, the display and the sensor. The at least one processor may be configured to: display an image acquired by driving the camera as a preview image on the display, acquire a first input specifying a start point and an end point on a subject included in the preview image, acquire depth information about the subject through the sensor, present a guide proposing a corrected start point and a corrected end point based on the acquired depth information, request whether to approve the presented guide, and, in response to acquiring a second input approving the presented guide, measure a length of the subject based on a distance between the start point and the end point.

An electronic device and method in various example embodiments of the present disclosure may accurately measure the length of an object by correcting a reference point for length measurement in the field of augmented reality.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used for the same or similar components.

DETAILED DESCRIPTION

Figure 1:
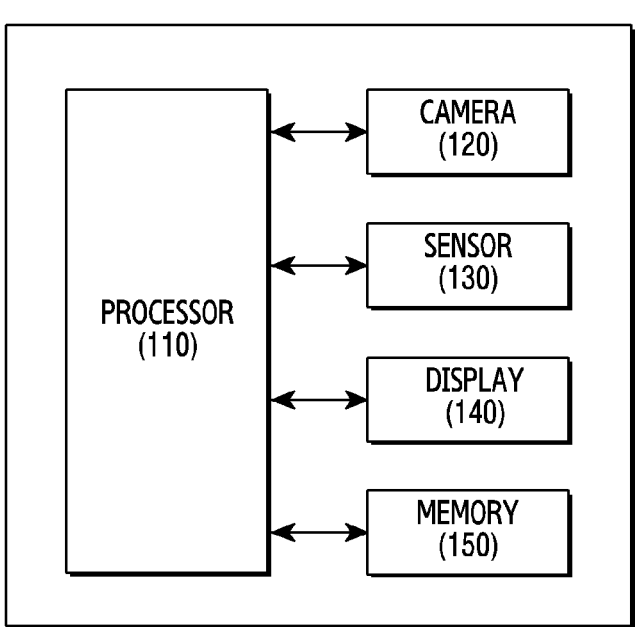
FIG. 1 is a block diagram illustrating an example configuration of an electronic device according to various embodiments.

FIG. 1 is a block diagram illustrating an example configuration of an electronic device according to various embodiments.

Referring to FIG. 1, the electronic device 100 may include a processor (e.g., including processing circuitry) 110, a camera 120, a sensor 130, a display 140, and a memory 150. In various embodiments, the electronic device 100 may include additional components in addition to the components shown in FIG. 1 or may omit at least one of the components shown in FIG. 1.

According to an embodiment, the processor 110 may include various processing circuitry and execute operations or data processing related to control and/or communication of at least one other component of the electronic device 100 using instructions stored in the memory 150. According to an embodiment, the processor 110 may include at least one of a central processing unit (CPU), a graphics processing unit (GPU), a micro controller unit (MCU), a sensor hub, a supplementary processor, a communication processor, an application processor, an application specific integrated circuit (ASIC), and a field programmable gate array (FPGA), and may have a plurality of cores.

According to an embodiment, the processor 110 may execute an application (e.g., an augmented reality application) stored in the memory 150. According to an embodiment, the processor 110 may acquire an image using the camera 120 in a state where the augmented reality application is running. An application described in the present disclosure is not limited to the augmented reality application, and may be any applications using the camera 120.

According to an embodiment, the processor 110 may analyze an image in order to measure a length of a subject included in a preview image. For example, the processor 110 may distinguish between an object (e.g., a person) and a background included in the image or extract feature points related to the image. According to an embodiment, the processor 110 may determine an outer surface of the object included in the image.

According to an embodiment, the processor 110 may store an image and length information about an object included in the image in the memory 150, based on acquiring (or capturing) the image (e.g., a still image and a moving image or video) through an augmented reality application. For example, the processor 110 may store a process of measuring a length in the memory 150 in the form of a screen shot or image. Contents related to the operation of the processor 110 will be described later with reference to FIG. 3.

According to an embodiment, the camera 120 may acquire (or capture) an image (e.g., a still image and a moving image). For example, an image signal processor (not shown) electrically connected to the camera 120 may distinguish between an object (e.g., a person) and a background that are included in the image (e.g., a preview image, or an image stored in the memory 150). An image signal processor may extract feature points of the image (e.g., the preview image, or the image included in the memory 150). According to an embodiment, the feature points may be used to identify (or recognize) an outer surface of the image. The image signal processor may be separated from the camera 120, or be implemented as part of the processor 110. According to an embodiment, the camera 120 may include an image sensor. According to an embodiment, the image sensor may acquire and process color information.

According to an embodiment, the sensor 130 may detect at least one of a posture and location of the electronic device 100. According to an embodiment, the sensor 130 may measure a physical quantity and convert it into an electrical signal or provide a data value. According to an embodiment, the sensor 130 may detect a posture or posture change of the electronic device 100 using the electrical signal or data value. According to an embodiment, the sensor 130 may include at least one of a depth sensor, a ToF sensor, a gyro sensor (or gyroscope), a gravity sensor, or an acceleration sensor.

According to an embodiment, the depth sensor may measure a depth of an external object, and provide depth information corresponding to the external object using the measured depth. According to various embodiments, a gyro sensor, a gravity sensor, an acceleration sensor, or a combination of two or more of these may perform the operations of the sensor 130, by sensing a rotation of the electronic device 100, a change of orientation of the electronic device 100, or a slope of the electronic device 100.

According to an embodiment, the sensor 130 may be operatively connected to the processor 110, the camera 120, and/or the memory 150, and perform the processing of color information, 3D information, distance information, and location information.

According to an embodiment, the display 140 may provide a driving signal by converting a video signal, data signal, and/or control signal processed by the processor 110.

According to an embodiment, the display 140 may be implemented as a plasma display panel (PDP), a liquid crystal display (LCD), an organic light emitting diode (OLED), or a flexible display, and may also be implemented as a three-dimensional (3D) display. According to an embodiment, the display 140 may be include a touch screen and be used as an input device in addition to an output device.

The display 140 of an embodiment may display an image acquired through the camera 120. According to an embodiment, the display 140 may display length information about an object included in an image, by superposing or floating the length information about the object included in the image on the image. According to an embodiment, the electronic device 100 may acquire a user input (e.g., a touch input) through the display 140, and deliver the user input to the processor 110.

According to an embodiment, the memory 150 may refer to one or more memory sets. According to an embodiment, the memory 150 may store data and/or command received from other components (e.g., the processor 110, the camera 120, the sensor 130, and the display 140) or provided by the other components. In various embodiments, the memory 150 may store an application (e.g., an augmented reality application) that uses the camera 120. According to an embodiment, the memory 150 may store length information about a plurality of objects.

Figure 2:
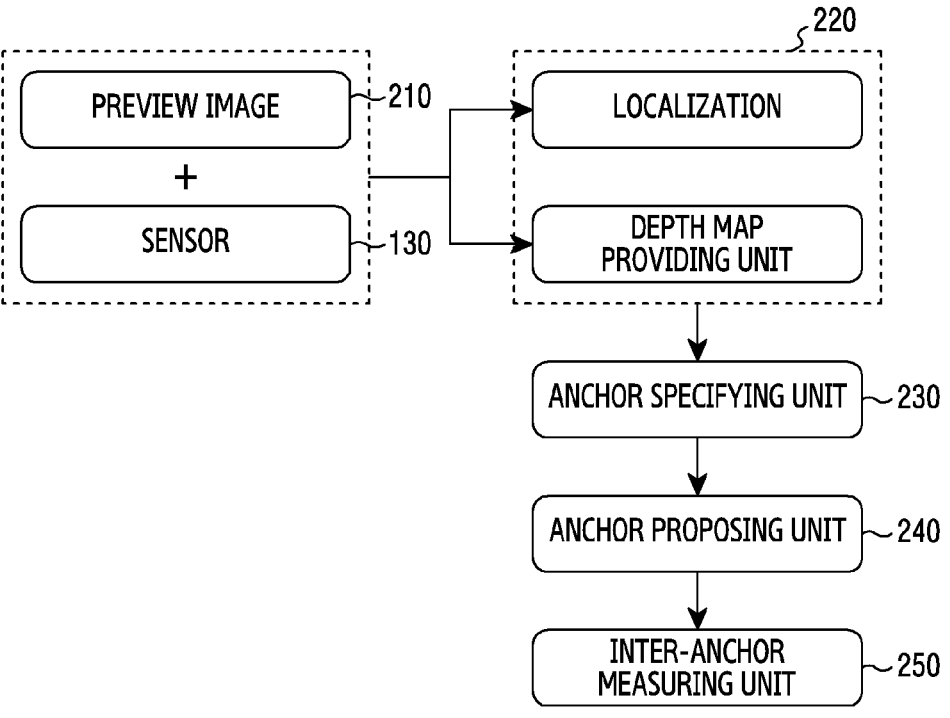
FIG. 2 is a diagram illustrating an example of proposing an anchor, based on spatial information, in an electronic device according to various embodiments.

FIG. 2 is a diagram illustrating an example of proposing an anchor, based on spatial information, in an electronic device according to various embodiments.

Referring to FIG. 2, the processor 110 of an embodiment may acquire spatial information using a preview image 210 and the sensor 130.

According to an embodiment, the processor 110 may acquire three-dimensional spatial information around the electronic device 100, based on the preview image 210 acquired through the camera 120 and sensor information acquired using the sensor 130. For example, the sensor information may include at least one of an inertial measurement unit (IMU), GPS information, and azimuth information. According to an embodiment, the processor 110 may acquire the three-dimensional spatial information around the electronic device 100 in a state where an augmented reality application is running.

According to an embodiment, the processor 110 may form a world coordinate system 220 covering the entire space, based on the acquired three-dimensional spatial information. According to an embodiment, to configure the world coordinate system 220, the processor 110 may begin 6 degree of freedom (6DoF) tracking after localization is completed. According to an embodiment, the localization may include predicting a pose of the camera 120, and the 6DoF tracking may include tracking a rotation of the electronic device 100 and a location of the electronic device 100.

According to an embodiment, the processor 110 may provide a depth map corresponding to the preview image 210. According to an embodiment, the processor 110 may divide the preview image 210 into a plurality of areas using the provided depth map. According to an embodiment, at least one object included in the preview image 210 may correspond to at least a partial area of the depth map. According to an embodiment, the processor 110 may predict a plane from the preview image 210, and provide plane information of the preview image 210, based on the depth map and the predicted plane.

According to an embodiment, an anchor specifying unit (e.g., including various circuitry and/or executable program instructions) 230 may provide a three-dimensional coordinate value of an anchor point specified by a user input. According to an embodiment, based on a user input (e.g., touch input) specifying a start point and end point for measuring a length of an object included in the preview image 210, the anchor specifying unit 230 may provide a three-dimensional coordinate value corresponding to each point.

According to an embodiment, an anchor proposing unit (e.g., including various circuitry and/or executable program instructions) 240 may propose an anchor point to enable accurate measurement, based on sensor information and depth information of a preview image. According to an embodiment, when it is determined that a distance between a subject included in the preview image and the electronic device 100 is within a specified distance, the anchor proposing unit 240 may propose a start point as the closest contact point among contact points between the subject and a plane, based on plane information.

According to an embodiment, the anchor proposing unit 240 may acquire outer information of a subject through machine learning, and propose an end point as an outer point closest to the end point specified by a user among outer points of the subject, based on the acquired outer information.

According to an embodiment, an inter-anchor measuring unit (e.g., including various circuitry and/or executable program instructions) 250 may measure a distance between three-dimensional coordinate values corresponding to anchor points. For example, the inter-anchor measuring unit 250 may measure the distance between the three-dimensional coordinate values corresponding to a start point and end point proposed by the anchor proposing unit 240.

Figure 3:
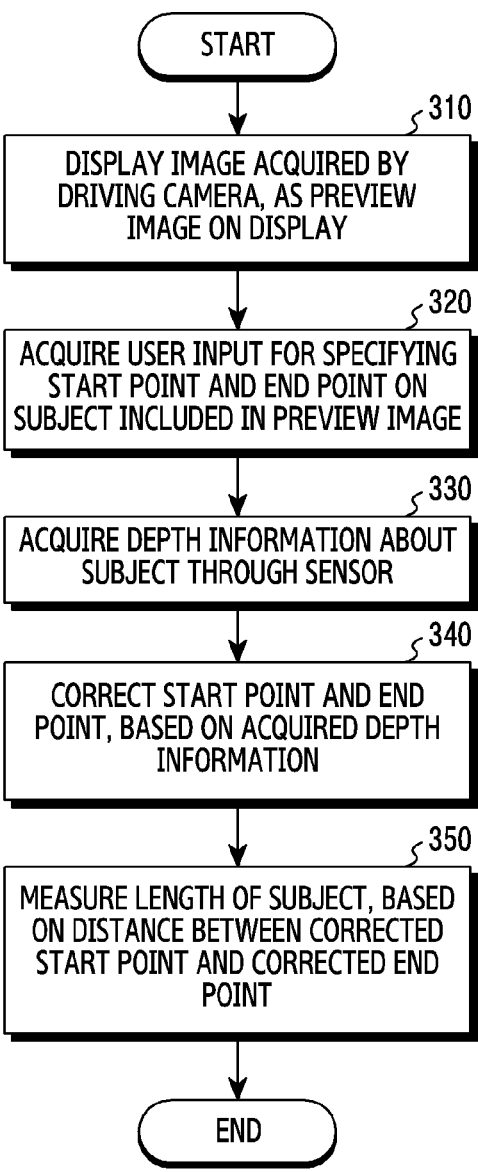
FIG. 3 is a flowchart illustrating an example operation of measuring the length of an object included in a preview image in an electronic device according to various embodiments.

FIG. 3 is a flowchart illustrating an example process of measuring a length of an object included in a preview image in an electronic device according to various embodiments.

Referring to FIG. 3, in operation 310, the processor 110 of an embodiment may display an image acquired by driving a camera (e.g., the camera 120 of FIG. 1), as a preview image on a display (e.g., the display 140 of FIG. 1). According to an embodiment, the processor 110 may display an image acquired through the camera 120 as a preview image on the display 140, in a state where an augmented reality application stored in the memory 150 is running.

According to an embodiment, in operation 320, the processor 110 may acquire a user input for specifying a start point and an end point on a subject included in the preview image. According to an embodiment, the processor 110 may display the start point and/or the end point on the display 140, based on the user input (e.g., a touch input) to the display 140. For example, the processor 110 may display a user interface indicating the start point and/or the end point on the display 140. According to an embodiment, the start point and/or the end point may be any points on the subject.

According to an embodiment, the processor 110 may zoom-in a screen including a subject and display it on at least a partial area of the display 140 wherein a user is allowed to easily specify a start point and/or an end point. According to an embodiment, the processor 110 may display, on the display 140, a user interface (UI) respectively corresponding to the start point and/or end point specified by the user. For example, the user interface may include a dot or circle shape.

According to an embodiment, the processor 110 may convert a start point and/or end point corresponding to a user input into three-dimensional spatial coordinates. For example, the processor 110 may convert two-dimensional information about the start point and/or end point specified by the user into three-dimensional spatial coordinates, using a projection matrix.

According to an embodiment, in operation 330, the processor 110 may acquire depth information about a subject through a sensor (e.g., the sensor 130 of FIG. 1). According to an embodiment, the processor 110 may acquire depth information and/or distance information about at least one object included in a preview image, using the sensor 130 (e.g., a depth sensor, a ToF sensor, or an image sensor). According to an embodiment, the processor 110 may provide the depth map corresponding to the preview image.

According to an embodiment, the processor 110 may measure a depth of an external object (e.g., a subject) using the sensor 130, and provide depth information corresponding to the external object using the measured depth.

According to an embodiment, in operation 340, the processor 110 may correct the start point and the end point, based on the acquired depth information. According to an embodiment, the processor 110 may predict a plane being in contact with the external object using at least one of the acquired depth information and a point cloud.

According to an embodiment, when it is determined that the external object is in contact with the plane, the processor 110 may provide plane information about the plane being in contact with the external object. According to an embodiment, when it is determined that the external object is not in contact with the plane, the processor 110 may provide plane information about a virtual plane. For example, the processor 110 may provide the plane information about the virtual plane, based on 3-axis information in a spatial coordinate system.

According to an embodiment, the processor 110 may correct the start point and/or the end point, based on the depth information about the at least one object included in the preview image and the plane information about the plane included in the preview image. According to an embodiment, the processor 110 may correct the start point to a contact point closest to the start point specified by the user among the contact points between the subject and the plane, based on the plane information. According to an embodiment, the processor 110 may acquire outer information of the subject through machine learning. According to an embodiment, the processor 110 may correct the end point to an outer point closest to the end point specified by the user among the outer points of the subject, based on the acquired outer information.

According to an embodiment, the processor 110 may display a user interface indicating the corrected start point and the corrected end point, on the display 140. For example, the processor 110 may display an anchor point specified by the user and a corrected anchor point on the display 140, together.

According to an embodiment, in operation 350, the processor 110 may measure a length of the subject, based on a distance between the corrected start point and the corrected end point. According to an embodiment, the length of the subject may include at least one of a height of the subject, a width of the subject, and a length from any position on the subject to any position.

According to an embodiment, the processor 110 may display the measured actual length of the subject on the display 140. For example, the processor 110 may display the length of the subject in an area adjacent to the subject. According to an embodiment, when it is determined that the measurement is completed, the processor 110 may remove the display of length information from the display 140.

According to an embodiment, the processor 110 may store an image and information about a length of an object included in the image in the memory 150, together, based on acquiring (or capturing) the image through the augmented reality application.

Figure 4:
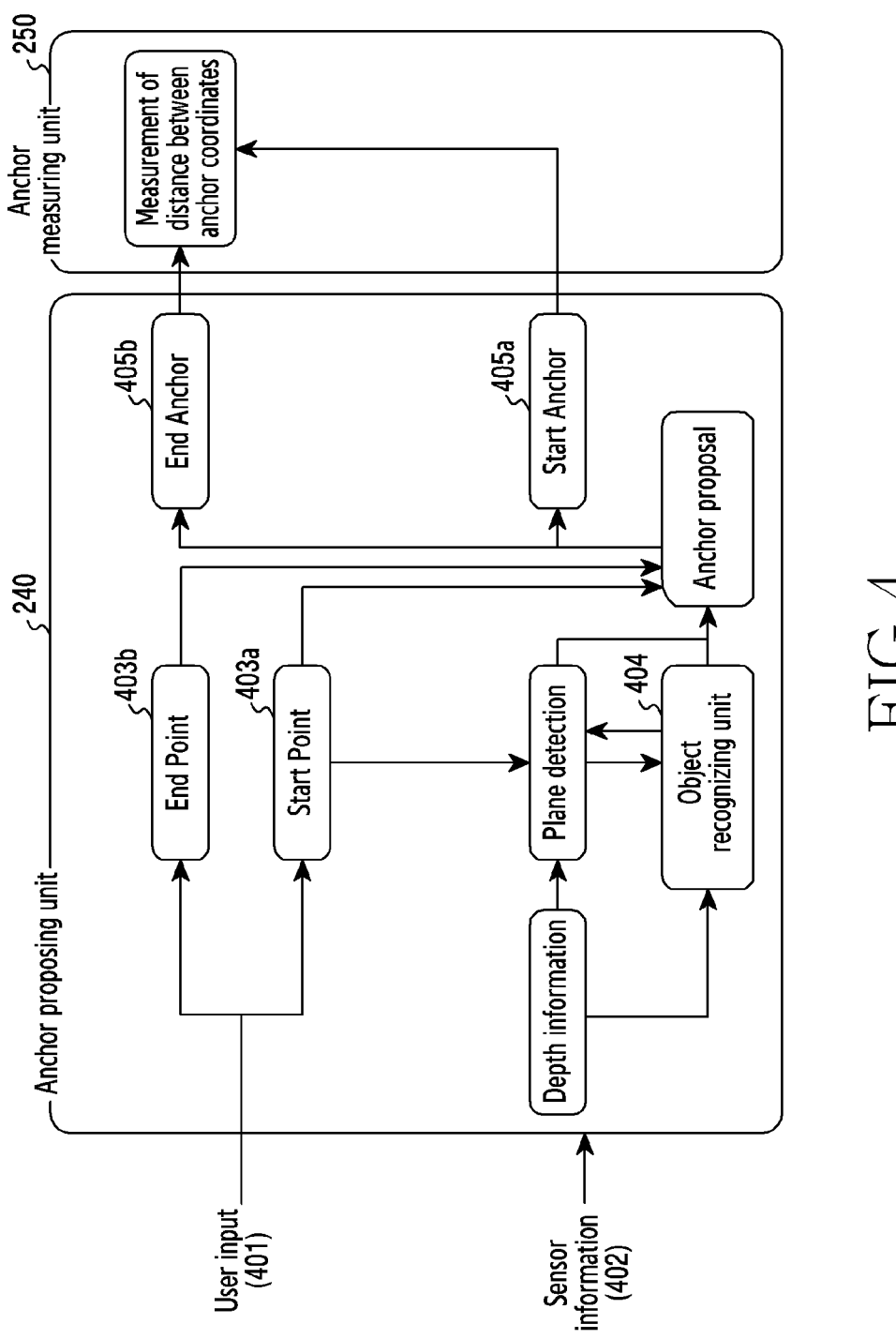
FIG. 4 is a diagram illustrating an example process of measuring the length of a subject using spatial information and sensor information in an electronic device according to various embodiments.

FIG. 4 is a diagram illustrating an example of measuring a length of a subject using spatial information and sensor information in an electronic device according to various embodiments. Contents similar to or overlapping with those described above with respect to FIG. 2 may be simplified or may not be repeated.

Referring to FIG. 4, the electronic device 100 of an embodiment may provide a user input 401 and sensor information 402 to the anchor proposing unit 240. According to an embodiment, the electronic device 100 may display an image acquired through the camera 120 as a preview image on the display 140, in a state where an augmented reality application is running.

According to an embodiment, the user input 401 may include a touch input on the display 140 for specifying a start point 403a and/or an end point 403b in a preview image. According to an embodiment, the start point 403a and end point 403b determined by the user input 401 may correspond to two-dimensional coordinate values, respectively. According to an embodiment, the coordinate values corresponding to the start point 403a and end point 403b may be converted into three-dimensional spatial coordinates, respectively. For example, at least one anchor point specified by a user may be converted into a three-dimensional spatial coordinate through a projection matrix operation.

According to an embodiment, the sensor information 402 may include at least one of depth information about at least one object included in a preview image, plane information of the preview image, and location information or posture information of the electronic device 100.

According to an embodiment, an object recognizing unit (e.g., including various circuitry and/or executable program instructions) 404 may recognize at least one object included in a preview image, based on depth information about the at least one object included in the preview image and plane information of the preview image. For example, the object recognizing unit 404 may recognize the at least one object included in the preview image and determine a feature point of the object or an outer surface of the object.

According to an embodiment, the anchor proposing unit 240 may propose an anchor point, based on a start point and/or end point specified by the user input 401 and information about an object. According to an embodiment, the anchor proposing unit 240 may propose a start anchor 405a obtained by correcting the start point 403a and/or an end anchor 405b obtained by correcting the end point 403b.

According to an embodiment, when it is determined that a distance between an object whose length is to be measured and the electronic device 100 is within a specified distance, the anchor proposing unit 240 may propose, as the start anchor 405a, a contact point closest to the start point 403a among contact points between the object and a plane, based on depth information and plane information.

According to an embodiment, the anchor proposing unit 240 may acquire outer information of an object whose length is to be measured, and may propose, as the end anchor 405b, an outer point closest to the end point 403b among outer points of the object, based on the acquired outer information.

According to an embodiment, the anchor proposing unit 240 may present a guide for the start anchor 405a and/or the end anchor 405b. For example, the anchor proposing unit 240 may display a user interface indicating the start anchor 405a and/or end anchor 405b through the display 140. According to an embodiment, the processor 110 may request a user to approve the guide presented by the anchor proposing unit 240. According to an embodiment, the processor 110 may acquire a user input approving the presented guide.

According to an embodiment, an anchor measuring unit 250 may measure a distance between three-dimensional coordinates corresponding to the start anchor 405a and the end anchor 405b. According to an embodiment, the anchor measuring unit 250 may measure an actual length of an object (e.g., a height of the object and/or a width of the object) by measuring the distance between the three-dimensional coordinates corresponding to the start anchor 405a and the end anchor 405b. According to an embodiment, in response to the determination of the start anchor 405a and the end anchor 405b, the anchor measuring unit 250 may automatically measure the length of the object. According to an embodiment, in response to acquiring a user input approving a guide presented by the anchor proposing unit 240, the anchor measuring unit 250 may measure the length of the object.

Figure 5:
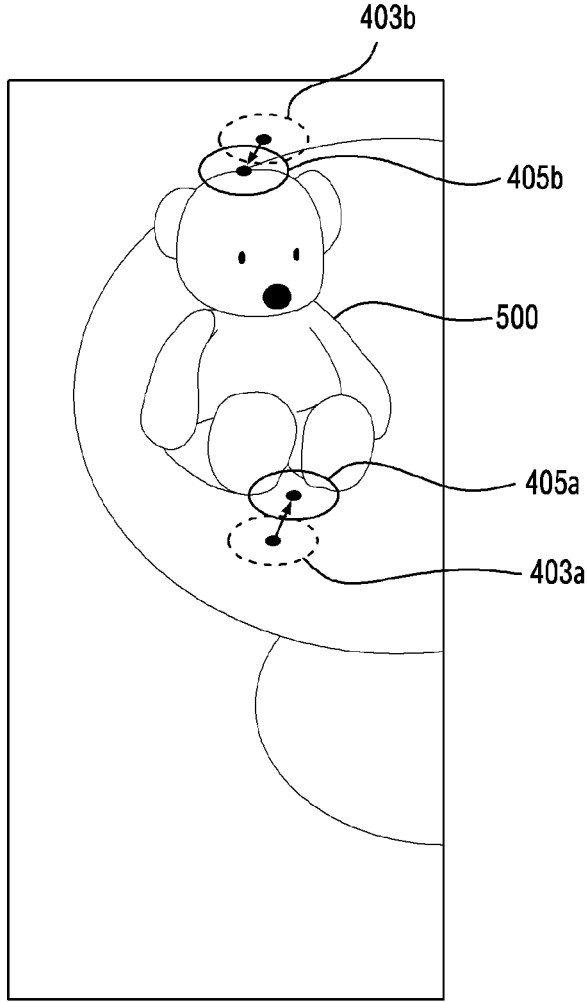
FIG. 5 is a diagram illustrating an example of displaying a corrected start point and end point on a display in an electronic device according to various embodiments.

FIG. 5 is a diagram illustrating an example of displaying a corrected start point and end point on a display in an electronic device according to various embodiments.

Referring to FIG. 5, the processor 110 of an embodiment may acquire a user input for specifying the start point 403a and end point 403b for measuring a length of at least a part of a subject 500 included in a preview image acquired through the camera 120.

According to an embodiment, when it is determined that a distance between the start point 403a specified by a user and the subject 500 is within a specified distance, the processor 110 may determine, as the start anchor 405a, for example, a contact point closest to the start point 403a among contact points between the subject 500 and a plane, based on plane information included in a preview image. For example, when it is determined that the subject 500 is in contact with the plane, the processor 110 may determine, as the start anchor 405a, a contact point closest to the start point 403a among contact points with the plane being in contact with the subject 500. For another example, when it is determined that the subject 500 is not in contact with the plane, the processor 110 may determine a virtual plane, and determine, as the start anchor 405a, a contact point closest to the start point 403a among contact points with the virtual plane.

According to an embodiment, the processor 110 may acquire outer information of the subject 500, and determine the end anchor 405b obtained by correcting the end point 403b, based on the acquired outer information. For example, the processor 110 may recognize outer points of the subject 500 through machine learning, and determine, as the end anchor 405b, an outer point closest to the end point 403b among the outer points of the subject 500.

According to an embodiment, the processor 110 may display the start point 403a and the end point 403b in a first color or a first shape through the display 140, and display the start anchor 405a and the end anchor 405b in a second color or a second shape.

According to an embodiment, the processor 110 may acquire a user feedback for the start anchor 405a and/or the end anchor 405b. For example, processor 110 may acquire a user input approving the start anchor 405a and/or the end anchor 405b. For another example, the processor 110 may acquire a user input rejecting the start anchor 405a and/or the end anchor 405b.

According to an embodiment, the processor 110 may correct an anchor point, based on the acquired user feedback. For example, in response to acquiring a user input approving the proposed anchor point, the processor 110 may correct (e.g., move) the start point 403a and end point 403b to the start anchor 405a and end anchor 405b, respectively. According to an embodiment, when acquiring the user input approving, the processor 110 may measure a length of the subject 500, based on the corrected start anchor 405a and end anchor 405b. According to an embodiment, the processor 110 may present the measured length through the display 140.

For another example, in response to acquiring a user input rejecting the proposed anchor point, the processor 110 may not correct (e.g., move) the start point 403a and end point 403b to the start anchor 405a and end anchor 405b, respectively. At this time, the processor 110 may remove the display of a user interface indicating the start anchor 405a and end anchor 405b.

Figure 6:
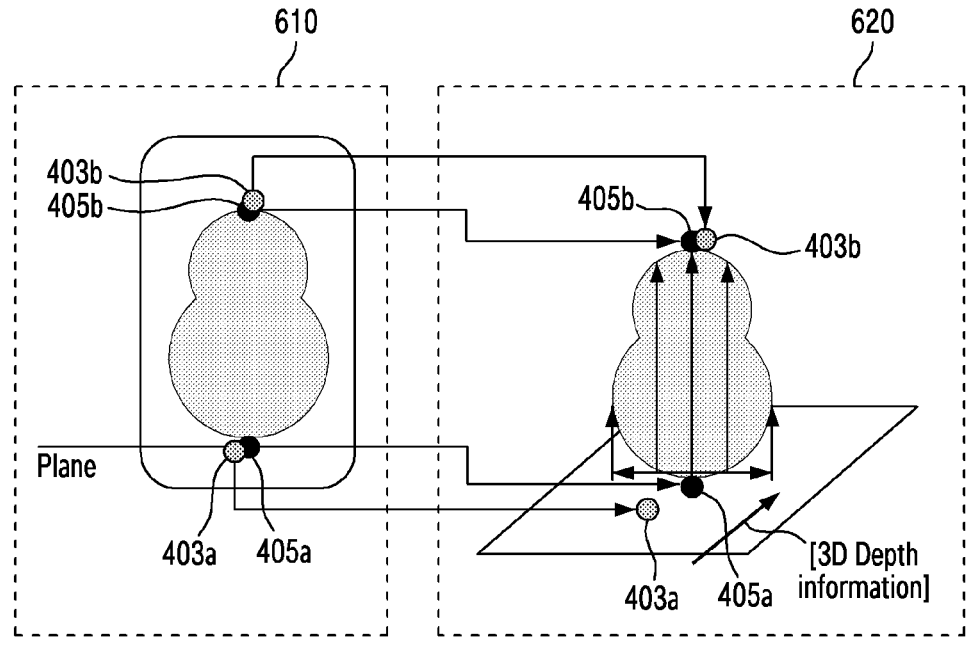
FIG. 6 is a diagram illustrating an example of converting two-dimensional coordinates corresponding to a user input for measuring the length of a subject into three-dimensional spatial coordinates in an electronic device according to various embodiments.

FIG. 6 is a diagram illustrating an example of converting two-dimensional coordinates corresponding to a user input for measuring a length of a subject into three-dimensional spatial coordinates in the electronic device 100 according to various embodiments.

Referring to FIG. 6, the processor 110 of an embodiment may specify the start point 403a and the end point 403b for measuring a length of at least one object acquired through the camera 120, in a state where an augmented reality application is running. For example, the processor 110 may acquire a touch input specifying the start point 403a and end point 403b through the display 140.

According to an embodiment, the processor 110 may acquire two-dimensional coordinates for the start point 403a and end point 403b specified by the touch input in a two-dimensional coordinate system 610. According to an embodiment, the processor 110 may convert the two-dimensional coordinates respectively corresponding to the start point 403a and end point 403b into three-dimensional coordinates on a three-dimensional spatial coordinate system 620. For example, the processor 110 may convert the two-dimensional coordinates into the three-dimensional coordinates using a projection matrix operation.

According to an embodiment, the processor 110 may detect a contact point between an object to be measured and a plane using depth information and plane information in the three-dimensional spatial coordinate system 620. According to an embodiment, the processor 110 may determine a contact point closest to the start point 403a, as the start anchor 405a. According to an embodiment, the processor 110 may propose, as the end anchor 405b, an outer point closest to the end point 403b among outer points of the object. According to an embodiment, the processor 110 may propose, as the end anchor 405b, an outer point of an object perpendicular to an arbitrary axis on a plane including the start anchor 405a.

According to an embodiment, the processor 110 may measure an actual length of an object, based on a distance between the determined start anchor 405a and the determined end anchor 405b. However, the actual length of the object is not limited to a height of the object, and may include a width of the object or a length of at least a part of the object.

Figure 7:
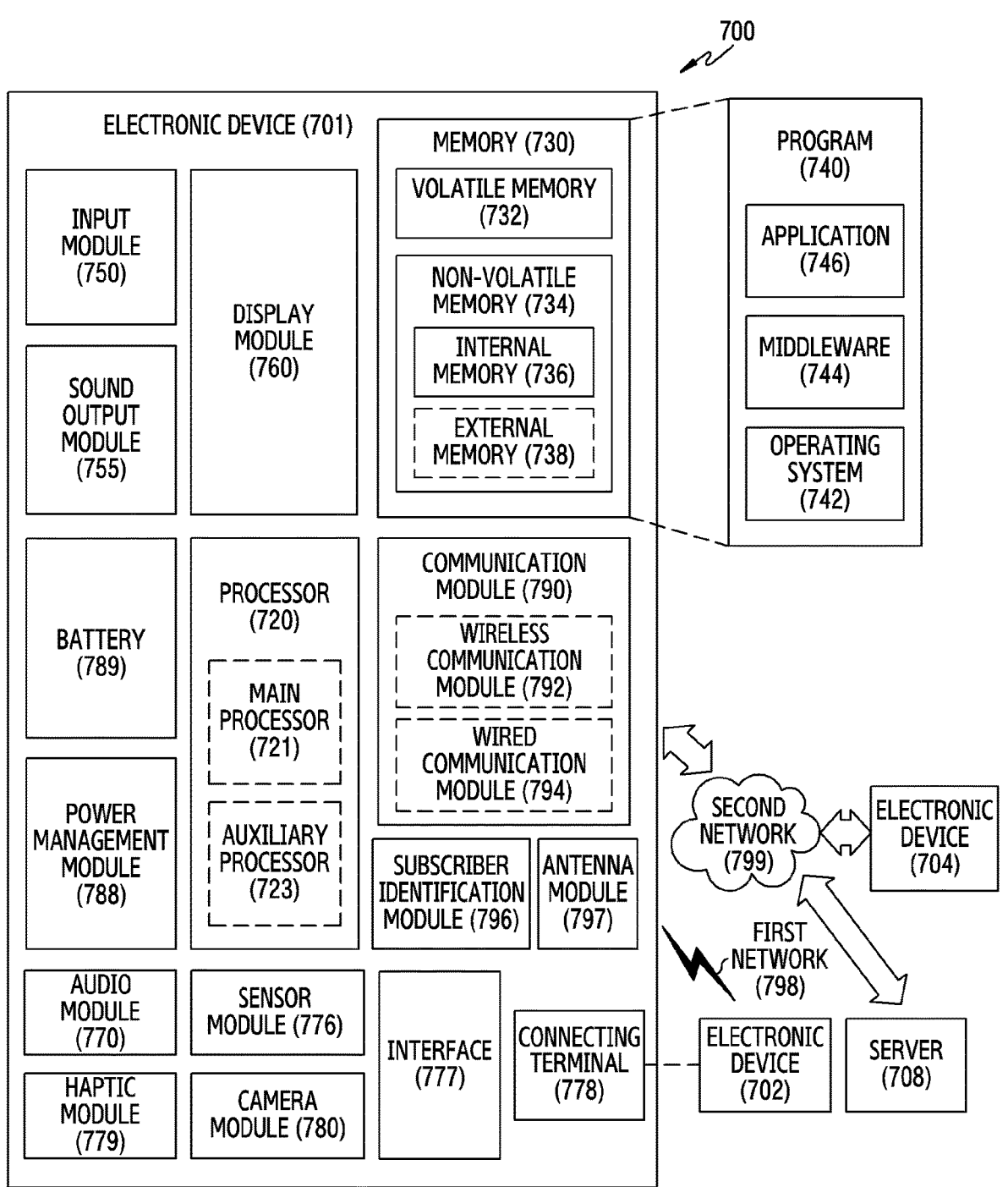
FIG. 7 is a block diagram illustrating an example electronic device in a network environment according to various embodiments.

FIG. 7 is a block diagram illustrating an example electronic device 701 in a network environment 700 according to various embodiments.

Referring to FIG. 7, the electronic device 701 in the network environment 700 may communicate with an electronic device 702 via a first network 798 (e.g., a short-range wireless communication network), or at least one of an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input module 750, a sound output module 755, a display module 760, an audio module 770, a sensor module 776, an interface 777, a connecting terminal 778, a haptic module 779, a camera module 780, a power management module 788, a battery 789, a communication module 790, a subscriber identification module (SIM) 796, or an antenna module 797. In various embodiments, at least one of the components (e.g., the connecting terminal 778) may be omitted from the electronic device 701, or one or more other components may be added in the electronic device 701. In various embodiments, some of the components (e.g., the sensor module 776, the camera module 780, or the antenna module 797) may be implemented as a single component (e.g., the display module 760).

The processor 720 may execute, for example, software (e.g., a program 740) to control at least one other component (e.g., a hardware or software component) of the electronic device 701 coupled with the processor 720, and may perform various data processing or computation. According to an embodiment, as at least part of the data processing or computation, the processor 720 may store a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), or an auxiliary processor 723 (e.g., a graphics processing unit (GPU), a neural processing unit (NPU), an image signal processor (ISP), a sensor hub processor, or a communication processor (CP)) that is operable independently from, or in conjunction with, the main processor 721. For example, when the electronic device 701 includes the main processor 721 and the auxiliary processor 723, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display module 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723. According to an embodiment, the auxiliary processor 723 (e.g., the neural processing unit) may include a hardware structure specified for artificial intelligence model processing. An artificial intelligence model may be generated by machine learning. Such learning may be performed, e.g., by the electronic device 701 where the artificial intelligence is performed or via a separate server (e.g., the server 708). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input module 750 may receive a command or data to be used by another component (e.g., the processor 720) of the electronic device 701, from the outside (e.g., a user) of the electronic device 701. The input module 750 may include, for example, a microphone, a mouse, a keyboard, a key (e.g., a button), or a digital pen (e.g., a stylus pen).

The sound output module 755 may output sound signals to the outside of the electronic device 701. The sound output module 755 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 760 may visually provide information to the outside (e.g., a user) of the electronic device 701. The display module 760 may include, for example, a display, a hologram device, or a projector and control circuitry to control a corresponding one of the display, hologram device, and projector. According to an embodiment, the display module 760 may include a touch sensor adapted to detect a touch, or a pressure sensor adapted to measure the intensity of force incurred by the touch.

The audio module 770 may convert a sound into an electrical signal and vice versa. According to an embodiment, the audio module 770 may obtain the sound via the input module 750, or output the sound via the sound output module 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to an embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The wireless communication module 792 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 792 may support a high-frequency band (e.g., the mmWave band) to achieve, e.g., a high data transmission rate. The wireless communication module 792 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 792 may support various requirements specified in the electronic device 701, an external electronic device (e.g., the electronic device 704), or a network system (e.g., the second network 799). According to an embodiment, the wireless communication module 792 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 797 may transmit or receive a signal or power to or from the outside (e.g., the external electronic device) of the electronic device 701. According to an embodiment, the antenna module 797 may include an antenna including a radiating element including a conductive material or a conductive pattern formed in or on a substrate (e.g., a printed circuit board (PCB)). According to an embodiment, the antenna module 797 may include a plurality of antennas (e.g., array antennas). In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

According to various embodiments, the antenna module 797 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 or 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, mobile edge computing (MEC), or client-server computing technology may be used, for example. The electronic device 701 may provide ultra low-latency services using, e.g., distributed computing or mobile edge computing. In an embodiment, the external electronic device 704 may include an internet-of-things (IoT) device. The server 708 may be an intelligent server using machine learning and/or a neural network. According to an embodiment, the external electronic device 704 or the server 708 may be included in the second network 799. The electronic device 701 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 8:
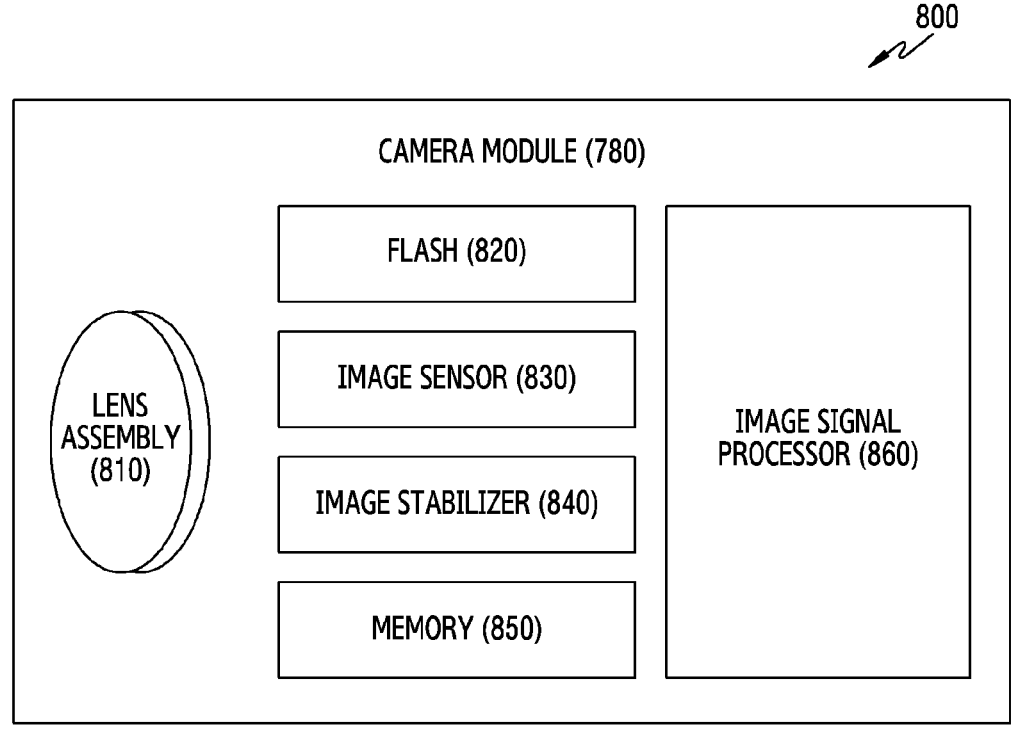
FIG. 8 is a block diagram illustrating an example configuration of a camera module according to various embodiments.

FIG. 8 is a block diagram 800 illustrating an example configuration of the camera module 780 according to various embodiments. Referring to FIG. 8, the camera module 780 may include a lens assembly (e.g., including at least one lens) 810, a flash 820, an image sensor 830, an image stabilizer (e.g., including circuitry) 840, a memory 850 (e.g., a buffer memory), and/or an image signal processor (e.g., including processing circuitry) 860. The lens assembly 810 may collect light emitted from a subject that is an image capture target. The lens assembly 810 may include one or more lenses. According to an embodiment, the camera module 780 may include a plurality of lens assemblies 810. In this case, the camera module 780 may form, for example, a dual camera, a 360-degree camera, or a spherical camera. Some of the plurality of lens assemblies 810 may have the same lens property (e.g., angle of view, focal length, auto focus, f number, or optical zoom), or at least one lens assembly may have one or more lens properties different from the lens property of another lens assembly. The lens assembly 810 may include, for example, a wide-angle lens or a telephoto lens.

The flash 820 may emit light used to enhance light emitted or reflected from a subject. According to an embodiment, the flash 820 may include one or more light emitting diodes (e.g., a red-green-blue (RGB) LED, a white LED, an infrared LED, or an ultraviolet LED), or a xenon lamp. By converting light emitted or reflected from the subject and delivered through the lens assembly 810 into an electrical signal, the image sensor 830 may acquire an image corresponding to the subject. According to an embodiment, the image sensor 830 may include, for example, one image sensor selected from among image sensors having different properties such as an RGB sensor, a black and white (BW) sensor, an IR sensor or a UV sensor, a plurality of image sensors having the same property, or a plurality of image sensors having different properties. Each image sensor included in the image sensor 830 may be implemented using, for example, a charged coupled device (CCD) sensor or a complementary metal oxide semiconductor (CMOS) sensor.

In response to the movement of the camera module 780 or the electronic device 701 including the same, the image stabilizer 840 may move at least one lens included in the lens assembly 810 or the image sensor 830 in a specific direction or control an operation characteristic (e.g., adjust a read-out timing, etc.) of the image sensor 830. This makes it possible to compensate at least part of a negative effect of the movement on an image being captured. According to an embodiment, the image stabilizer 840 may detect such a movement of the camera module 780 or the electronic device 701 using a gyro sensor (not shown) or an acceleration sensor (not shown) disposed inside or outside the camera module 780. According to an embodiment, the image stabilizer 840 may be implemented as, for example, an optical image stabilizer. The memory 850 may at least temporarily store at least a part of an image acquired through the image sensor 830 for the sake of a next image processing task. For example, when image acquisition based on a shutter is delayed or a plurality of images are acquired at high speed, the acquired original image (e.g., Bayer-patterned image or high resolution image) may be stored in the memory 850, and a copy image (e.g., low resolution image) corresponding thereto may be previewed through the display module 760. Thereafter, when a specified condition is satisfied (e.g., a user input or a system command), at least a part of the original image stored in the memory 850 may be acquired and processed by the image signal processor 860, for example. According to an embodiment, the memory 850 may be configured as at least a part of the memory 730 or as a separate memory operated independently of the memory 730.

The image signal processor 860 may include various processing circuitry and perform one or more image processes on an image acquired through the image sensor 830 or an image stored in the memory 850. The one or more image processes may include, for example, depth map provision, three-dimensional modeling, panorama provision, feature point extraction, image synthesis, or image compensation (e.g., noise reduction, resolution adjustment, brightness adjustment, blurring, sharpening, or softening). Additionally or alternatively, the image signal processor 860 may perform control (e.g., exposure time control or read-out timing control) for at least one (e.g., the image sensor 830) of the components included in the camera module 780. The image processed by the image signal processor 860 may be stored again in the memory 850 for further processing, or be presented to an external component (e.g., the memory 730, the display module 760, the electronic device 702, the electronic device 704, or the server 708) of the camera module 780. According to an embodiment, the image signal processor 860 may be configured as at least a part of the processor 720, or be configured as a separate processor operated independently of the processor 720. When the image signal processor 860 is configured as a processor separate from the processor 720, at least one image processed by the image signal processor 860 may be displayed through the display module 760 as it is or after additional image processing by the processor 720.

According to an embodiment, the electronic device 701 may include a plurality of camera modules 780 each having different properties or functions. In this case, for example, at least one of the plurality of camera modules 780 may be a wide-angle camera, and at least one other may be a telephoto camera. Similarly, the at least one of the plurality of camera modules 780 may be a front camera, and the at least other may be a rear camera.

As described above, an electronic device (e.g., the electronic device of FIG. 1) according to an example embodiment may include: a camera (e.g., the camera 120 of FIG. 1), a display (e.g., the display 140 of FIG. 1), a sensor (e.g., the sensor 130 of FIG. 1) configured to acquire depth information about at least one object, and at least one processor electrically connected to the camera, the display and the sensor. The at least one processor may be configured to: display an image acquired by driving the camera as a preview image on the display, acquire an input for specifying a start point and an end point on a subject included in the preview image, acquire depth information about the subject through the sensor, correct the start point and the end point based on the acquired depth information, and measure a length of the subject based on a distance between the corrected start point and the corrected end point.

According to an example embodiment, the at least one processor may be configured to convert two-dimensional coordinates corresponding to the start point and the end point into three-dimensional spatial coordinates using a projection matrix.

According to an example embodiment, the at least one processor may be configured to display a user interface (UI) indicating the start point and the end point, on the display.

According to an example embodiment, the at least one processor may be configured to: provide a plane from the preview image, and provide plane information of the preview image based on the depth information and the provided plane.

According to an example embodiment, based on determining that a distance between the specified start point and the subject is within a specified distance, the at least one processor may be configured to correct the start point to a contact point closest to the specified start point among contact points between the subject and the provided plane based on the provided plane information.

According to an example embodiment, the at least one processor may be configured to: acquire outer information of the subject through machine learning, and correct the end point to an outer point closest to the specified end point among outer points of the subject based on the acquired outer information.

According to an example embodiment, the at least one processor may be configured to present a UI for selecting whether to approve the corrected start point and the corrected end point.

According to an example embodiment, the at least one processor may, in response to acquiring an input rejecting the UI, be configured to: display a length of the subject measured based on the distance between the start point and the end point on the display, and, in response to acquiring an input approving the UI, display a length of the subject measured based on the distance between the corrected start point and the corrected end point on the display.

As described above, a method of operating an electronic device (e.g., the electronic device 101 of FIG. 1) according to an example embodiment may include: displaying an image acquired by driving a camera (e.g., the camera 120 of FIG. 1) as a preview image on a display (e.g., the display 140 of FIG. 1), acquiring an input for specifying a start point and an end point on a subject included in the preview image, acquiring depth information about the subject through a sensor, correcting the start point and the end point based on the acquired depth information, and measuring a length of the subject based on a distance between the corrected start point and the corrected end point.

According to an example embodiment, the method may further include displaying a user interface (UI) indicating the start point and the end point on the display.

According to an example embodiment, the method may further include: providing a plane from the preview image, and providing plane information of the preview image based on the depth information and the provided plane.

According to an example embodiment, the correcting may include based on determining that a distance between the specified start point and the subject is within a specified distance, correcting the start point to a contact point closest to the specified start point among contact points between the subject and the provided plane based on the provided plane information.

According to an example embodiment, the correcting may include: acquiring outer information of the subject through machine learning, and correcting the end point to an outer point closest to the specified end point among outer points of the subject, based on the acquired outer information.

According to an example embodiment, the method may further include presenting a UI for selecting whether to approve the corrected start point and the corrected end point.

According to an example embodiment, the method may include: in response to acquiring an input rejecting the UI, displaying a length of the subject measured based on the distance between the start point and the end point on the display, and, in response to acquiring an input approving the UI, displaying a length of the subject measured based on the distance between the corrected start point and the corrected end point on the display.

As described above, an electronic device (e.g., the electronic device of FIG. 1) according to an example embodiment may include: a camera (e.g., the camera 120 of FIG. 1), a display (e.g., the display 140 of FIG. 1), a sensor (e.g., the sensor 130 of FIG. 1) configured to acquire depth information about at least one object, and at least one processor electrically connected to the camera, the display and the sensor. The at least one processor may be configured to: display an image acquired by driving the camera as a preview image on the display, acquire a first input for specifying a start point and an end point on a subject included in the preview image, acquire depth information about the subject through the sensor, present a guide proposing a corrected start point and a corrected end point based on the acquired depth information, request whether to approve the presented guide, and, in response to acquiring a second input approving the presented guide, measure a length of the subject based on a distance between the start point and the end point.

According to an example embodiment, the at least one processor may be configured to display a user interface (UI) indicating the start point and the end point on the display.

According to an example embodiment, the at least one processor may be configured to: provide a plane from the preview image, and provide plane information of the preview image based on the depth information and the provided plane.

According to an example embodiment, based on determining that a distance between the specified start point and the subject is within a specified distance, the at least one processor may be configured to determine, as the corrected start point, a contact point closest to the specified start point among contact points between the subject and the provided plane based on the provided plane information.

According to an example embodiment, the at least one processor may be configured to: acquire outer information of the subject through machine learning, and determine, as the corrected end point, an outer point closest to the specified end point among outer points of the subject based on the acquired outer information.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a camera;
a display;
a sensor configured to acquire depth information about at least one object; and
at least one processor, comprising processing circuitry, electrically connected to the camera, the display and the sensor,
wherein the at least one processor is individually and/or collectively configured to:
display an image acquired by driving the camera as a preview image on the display;
acquire an input for specifying a start point and an end point on a subject comprised in the preview image;
acquire depth information about the subject through the sensor;
correct the start point to a contact point closest to the specified start point among contact points between the subject and a plane which is in contact with the subject and based on the acquired depth information and correct the end point based on the acquired depth information; and
measures a length of the subject based on a distance between the corrected start point and the corrected end point.

2. The electronic device of claim 1, wherein the at least one processor is configured to convert two-dimensional coordinates corresponding to the start point and the end point into three-dimensional spatial coordinates using a projection matrix.

3. The electronic device of claim 1, wherein the at least one processor is configured to display a user interface (UI) indicating the start point and the end point on the display.

4. The electronic device of claim 1, wherein the at least one processor is configured to: provide the plane from the preview image, and provide plane information of the preview image based on the depth information and the provided plane.

5. The electronic device of claim 1, wherein the at least one processor is configured to:
acquire outer information of the subject through machine learning; and
correct the end point to an outer point closest to the specified end point among outer points of the subject based on the acquired outer information.

6. The electronic device of claim 1, wherein the at least one processor is configured to present a UI for selecting whether to approve the corrected start point and the corrected end point.

7. The electronic device of claim 6, wherein the at least one processor is configured to:
in response to acquiring an input rejecting the UI, display a length of the subject measured based on the distance between the start point and the end point on the display; and in response to acquiring an input approving the UI, display a length of the subject measured based on the distance between the corrected start point and the corrected end point on the display.

8. A method of operating an electronic device, the method comprising:

displaying an image acquired by driving a camera as a preview image on a display;

acquiring an input for specifying a start point and an end point on a subject included in the preview image;

acquiring depth information about the subject through a sensor;

correcting the start point to a contact point closest to the specified start point among contact points between the subject and a plane which is in contact with the subject and based on the acquired depth information and correcting the end point based on the acquired depth information; and measuring a length of the subject based on a distance between the corrected start point and the corrected end point.

9. The method of claim 8, further comprising displaying a user interface (UI) indicating the start point and the end point, on the display.

10. The method of claim 8, further comprising:

providing the plane from the preview image; and providing plane information of the preview image based on the depth information and the provided plane.

11. The method of claim 8, wherein the plane is in contact with the subject.

12. The method of claim 8, wherein the correcting comprises:

acquiring outer information of the subject through machine learning; and correcting the end point to an outer point closest to the specified end point among outer points of the subject based on the acquired outer information.

13. The method of claim 8, further comprising presenting a UI for selecting whether to approve the corrected start point and the corrected end point.

14. The method of claim 13, further comprising:

in response to acquiring an input rejecting the UI, displaying a length of the subject measured based on the distance between the start point and the end point on the display; and in response to acquiring an input approving the UI, displaying a length of the subject measured based on the distance between the corrected start point and the corrected end point on the display.

15. An electronic device comprising:

a camera;

a display;

a sensor configured to acquire depth information about at least one object; and at least one processor, comprising processing circuitry, electrically connected to the camera, the display and the sensor, and configured to:

display an image acquired by driving the camera as a preview image on the display, acquire a first input for specifying a start point and an end point on a subject included in the preview image, acquire depth information about the subject through the sensor, present a guide proposing a corrected start point to a contact point closest to the specified start point among contact points between the subject and a plane which is in contact with the subject and based on the acquired depth information and a corrected end point based on the acquired depth information, request whether to approve the presented guide, and in response to acquiring a second input approving the presented guide, measure a length of the subject based on a distance between the start point and the end point.

16. The electronic device of claim 15, wherein the at least one processor is configured to display a user interface (UI) indicating the start point and the end point on the display.

17. The electronic device of claim 15, wherein the at least one processor is configured to provide the plane from the preview image, and provide plane information of the preview image based on the depth information and the provided plane.

18. The electronic device of claim 15, wherein the at least one processor is configured to:

acquire outer information of the subject through machine learning, and determine, as the corrected end point, an outer point closest to the specified end point among outer points of the subject based on the acquired outer information.

* * * * *